US006440250B1

(12) United States Patent
Romano, Jr. et al.

(10) Patent No.: US 6,440,250 B1
(45) Date of Patent: Aug. 27, 2002

(54) PROCESS FOR LAMINATING INK JET PRINT WITH A WATER-DISPERSIBLE, HYDROPHOBIC POLYESTER RESIN

(75) Inventors: Charles E. Romano, Jr., Rochester; Susan L. Dawson, Pittsford; Lawrence P. DeMejo, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/742,525

(22) Filed: Dec. 20, 2000

(51) Int. Cl.[7] .......................... B44C 1/165; B41M 3/12; B32B 27/36; C08F 20/00

(52) U.S. Cl. ....................... 156/230; 156/240; 156/247; 156/277; 156/289; 427/148; 428/480; 428/481; 428/913; 428/914; 525/437; 525/444

(58) Field of Search ................................ 156/230, 240, 156/241, 247, 277, 289; 427/146, 147, 148, 149; 428/41.3, 207, 343, 346, 857, 354, 914, 915, 480, 481, 195, 913; 525/437, 444, 444.5

(56) References Cited

U.S. PATENT DOCUMENTS 5,387,573 A 2/1995 Oldfield et al.
5,494,885 A * 2/1996 Kudo et al. ................. 503/227
5,662,976 A 9/1997 Popat et al.
5,958,601 A * 9/1999 Salsman ..................... 428/480
6,087,051 A 7/2000 Shoji et al.

* cited by examiner

*Primary Examiner*—J. A. Lorengo
(74) *Attorney, Agent, or Firm*—Harold E. Cole

(57) ABSTRACT

A process for laminating an ink jet print having the steps of: a) providing an ink jet print having a support having thereon an ink jet image; b) contacting the imaged surface of the ink jet print with a transfer laminating element to form a composite, the transfer laminating element having a flexible, polymeric support having thereon a protection layer of a water-dispersible, hydrophobic polyester resin having the following general formula: $I_n$-P-$A_m$ wherein I is an ionic group; n is an integer from 1–3; P is a polyester backbone; A is an aliphatic group having a straight or branched chain fatty acid or triglyceride thereof halving from about 6 to about 24 carbon atoms; and m is an integer from 3–8; c) applying heat and pressure to the composite to transfer the layer on top of the ink jet image; d) allowing the composite to cool; and e) peeling the flexible, polymeric support of the transfer laminating element from the composite to form the laminated ink jet print.

10 Claims, No Drawings

PROCESS FOR LAMINATING INK JET PRINT WITH A WATER-DISPERSIBLE, HYDROPHOBIC POLYESTER RESIN

CROSS REFERENCE TO RELATED APPLICATIONS

Reference is made to commonly-assigned copending U.S. patent application Ser. No. 09/742,982, filed Dec 20, 2002, Docket 81555HEC entitled "Ink Jet Printing Process", of Romano, Jr., et al; and U.S. patent application Ser. No. 08/742,752, filed on Dec. 20. 2002, Docket 82004HEC entitled "Ink Jet Recording Element", of Romano, Jr., et al.

FIELD OF THE INVENTION

This invention relates to an process for laminating ink jet prints with a transferable protection layer.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof a base layer for absorbing fluid and an ink-receiving or image-forming layer, and includes those intended for reflection viewing, which have an opaque support, and those intended for viewing by transmitted light, which have a transparent support.

Ink jet prints prepared by printing onto ink jet recording elements are subject to environmental degradation such as water smearing and light fade. For example, since ink jet dyes are water-soluble, they can migrate from their location in the ink-receiving layer when water comes in contact with the recording element after imaging.

To reduce the vulnerability of prints to degradation and to enhance gloss, ink jet prints are often laminated. Typically, such conventional lamination is a process whereby a continuous polymeric film bearing an adhesive is brought into contact with the surface of the print. Heat and/or pressure is then used to affix the continuous polymeric film to the print surface. The continuous polymeric film then serves as a barrier layer that is impermeable to water and further acts to diminish the fading of the print image caused by light.

However, there is a problem with prior art laminating films since they are typically supplied in roll format and must be cut, or less desirably torn, to separate the laminated print from the continuous roll of laminating film. A requirement to cut adds expense to a laminator design that is required to run in a continuous mode.

U.S. Pat. No. 5,662,976 discloses an assembly for creating laminated cards which comprises a sheet of card stock with a release coating and a sheet of laminating film adhering to the release coating. A card form is cut into the sheet of card stock, and a lamination strip, which is sufficiently large to fold over so as to laminate both surfaces of the card, is cut into the lamination sheet. After printing, the card and the lamination strip are removed, and the lamination strip folded over to laminate the card. However, there is a problem with this laminating film in that expensive cutting and perforating steps are required to prepare the laminated card.

U.S. Pat. No. 5,387,573 discloses a dye-donor element for thermal dye transfer comprising a support and a transferable protection layer wherein the transferable protection layer is less than about 1 $\mu$ thick and contains particles in an amount of up to about 75% of the transferable protection layer. However, there is no disclosure in this patent that the protection layer can be used with ink jet prints.

U.S. Pat. No. 6,087,051 relates to an ink jet recording element containing a protective overcoat layer of an aqueous polyurethane resin or an aqueous polyacryl resin. In addition, there are comparison examples in that patent which use a polyester resin, and the aqueous polyurethane resin and polyacryl resins are said to have advantages over the polyester resin. However, there are problems using a polyurethane resin or an aqueous polyacryl resin in that these resins have to be synthesized from virgin raw materials and the resins cannot be recycled.

It is an object of the invention to provide a process for laminating ink jet prints wherein the protection layer is sufficiently thick to protect ink jet images from degradation by water, and yet can be employed without resort to expensive cutting steps. It is still another object to provide a process that allows for the direct visual distinction between laminated and unlaminated regions of the print.

SUMMARY OF THE INVENTION

These and other objects are provided by the present invention which comprises a process for laminating an ink jet print comprising:

a) providing an ink jet print comprising a support having thereon an ink jet image;

b) contacting the imaged surface of the ink jet print with a transfer laminating element to form a composite, the transfer laminating element comprising a flexible, polymeric support having thereon a protection layer of a water-dispersible, hydrophobic polyester resin having the following general formula:

$$I_n\text{-P-}A_m$$

wherein

I is an ionic group;

n is an integer from 1–3;

P is a polyester backbone;

A is an aliphatic group comprising a straight or branched chain fatty acid or triglyceride thereof having from about 6 to about 24 carbon atoms, and m is an integer from 3–8;

c) applying heat and pressure to the composite to transfer the layer on top of the ink jet image;

d) allowing the composite to cool; and e) peeling the flexible, polymeric support of the transfer laminating element from the composite to form the laminated ink jet print.

In using the process of the invention, the durability of an ink jet image is improved using the transfer layer described above.

DETAILED DESCRIPTION OF THE INVENTION

The transfer laminating element employed in the invention comprises a flexible, polymeric support having thereon a protection layer of a water-dispersible, hydrophobic polyester resin as described above.

The flexible, polymeric support used in the invention can be, for example, various plastics including a polyester-type resin such as poly(ethylene terephthalate), poly(ethylene naphthalate), polycarbonate resins, polystyrene resins, polysulfone resins, methacrylic resins, cellophane, acetate plastics, cellulose diacetate, cellulose triacetate, vinyl chloride resins and polyester diacetate. The thickness of the support may be, for example, from about 6 to about 500 μm, preferably from about 6 to about 50 μm. In a preferred embodiment, the support is a transparent poly(ethylene terephthalate) film.

The water-dispersible, hydrophobic polyester resin in the protection layer has the formula as illustrated above. The ionic groups I in the above formula which provide the polymer with water-dispersibility are typically derived from a carboxylic acid group which is introduced into the resin by polyacid monomers such as trimellitic anhydride, trimellitic acid, or maleic anhydride or sulfonate groups which come from monomers such as dimethyl 5-sulfoisophthalate, dimethyl 5-sulfo, 1,3-benzenedicarboxylate, sulfoisophthalate ethylene glycol, dihydroxyethyl-5-sulfo-1,3-benzenedicarboxylate, or from sulfonated alkenically unsaturated end groups as described in U.S. Pat. No. 5,281,630, the disclosure of which is hereby incorporated by reference. The weight percent of ionic monomers in the resin is from 1% to 20%, but 1% to 10% is preferred.

The backbone P of the polymer in the above formula is composed of polyester groups. It can be any linear or branched polyester made using polyacids and polyalcohols. The weight percent of the polyester backbone ingredients range from 30–80% of the whole resin, with the most preferred being 50–60% by weight. Examples of aromatic dicarboxylic acids useful in the backbone polyester polymer, P, employed in the invention include, but are not limited to terephthalic, isophthalic, phthalic, and 2,6-naphthoic, succinic, glutaric, adipic, 1,4-cyclohexane dicarboxylic, maleic, fumaric, and azelaic. The polyalcohol component of the polyester can be virtually any dihydroxy functional compound. Aliphatic and alicyclic glycols would be the most useful. Useful glycols include, but are not limited to, ethylene glycol, 1,3-propylene glycol, 1,2-propylene glycol, dipropylene glycol, tripropylene glycol, 1,4-butanediol, 1,5-pentanediol, 1,6-hexanediol, cyclohexanedimethanol, diethylene glycol, and triethylene glycol.

The backbone polyester consisting of any combination of the above polyacids and glycols may further directly include or incorporate by transesterification a multifunctional polyol selected from, but not limited to, glycerol, trimethylolpropane, erythritol, pentaerythritol, trimethylolethane, or a monosaccharide.

As noted above, A in the above formula is an aliphatic group comprising a straight or branched chain fatty acid or triglyceride thereof having from about 6 to about 24 carbon atoms, such as stearic, oleic, palmitic, lauric, linoleic, linolenic, behenic acid, or their mixtures. These can come from hydrogenated or unhydrogenated animal or vegetable oil, such as beef tallow, lard, corn oil, or soy bean oil. The weight percent of the aliphatic moiety can be 10–60%, with 20–40% by weight being the preferred amount.

In a preferred embodiment of the invention, the water-dispersible, hydrophobic polyester resin employed comprises a reaction product of 30–70% by weight of a poly (ethylene terephthalate) condensation polymer, 5–40% by weight of a hydroxy functional compound having at least two hydroxyl groups, 1–20% by weight of a carboxy functional compound having at least two carboxyl groups and 10–60% by weight of a $C_6$–$C_{24}$ straight chain or branched fatty acid or triglyceride. The resin is further characterized in that the hydroxy functional compound is present at 1–3 times the equivalents of the hydrophobic moiety. The preparation of such hydrophobic polyester resins is described in detail in U.S. Pat. No. 5,958,601, the disclosure of which is hereby incorporated by reference. In another preferred embodiment, the water-dispersible, hydrophobic polyester resin comprises water-dispersed transesterified polyester, e.g., poly(ethylene terephthalate) transesterified in the presence of stearic acid and trimellitic acid, or oleic acid and trimellitic acid.

In another preferred embodiment of the invention, the water-dispersible, hydrophobic polyester as described above is physically mixed with a thermoplastic or thermosetting polymer. The thermoplastic or thermosetting polymer lends added hydrophobicity to the layer, as well as enhanced coating flexibility and serves as a diluent to the polyester component to minimize cross-linking which would deleteriously alter coating properties.

Examples of such thermoplastic or thermosetting polymers useful in the invention include, but are not limited to, carboxylated styrene butadiene, styrene/acrylate or methacrylate ester compositions containing acrylic or methacrylic acids, hydrolyzed styrene maleic anhydride copolymers, styrene maleic acid salt copolymers, styrene maleic ester copolymers, styrene (meth)acrylate copolymers, styrene (meth)acrylate ester copolymers, styrene acrylate ester acrylonitrile terpolymers, acrylonitrile (meth)acrylate salt copolymers, polycarbonate-based polyurethanes, polyester-based polyurethanes, cellulose polymers, such as methyl cellulose and cellulose acetate butyrate, polyesters, polyamides, polyacetals, epoxy polymers, phenoxy polymers, etc. In a preferred embodiment, the water-dispersible, hydrophobic polyester resin and thermoplastic or thermosetting polymer is present in a ratio from about 1:4 to 4:1.

A preferred aqueous dispersion of a mixture of carboxylated styrene butadiene copolymer and a hydrophobic polyester of the composition generally described above is commercially available as EvCote® PWRHS-37 from EvCo Research Incorporated, Atlanta, Ga., USA.

In another preferred embodiment, the protection layer may also contain a synthetic or natural wax, such as an aqueous dispersion of high density polyethylene, Jon Wax 26® (S. C. Johnson Co.) or an aqueous dispersion of carnauba wax (Michelman Co.); and/or a microgel, such as a microgel of methyl methacrylate/ethylene glycol dimethacrylate/acrylic acid.

Since the transfer lamination element may come in contact with other image recording articles or the drive or transport mechanisms of laminating devices, additives such as surfactants, lubricants, matte particles and the like may be added to the element to the extent that they do not degrade the properties of interest.

The protection layer described above may be coated by conventional coating means onto the support such as wound wire rod coating, slot coating, slide hopper coating, gravure, curtain coating and the like.

Ink jet inks used to prepare the images to be protected using the invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Any known ink jet image-receiving layer can be used in the present invention. For example, the image-receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like; derivatives of natural polymers such as functionalized proteins, functionalized gums and starches, and cellulose ethers and their derivatives; and synthetic polymers such as polyvinyloxazoline, polyvinylmethyloxazoline, polyoxides, polyethers, poly(ethylene imine), poly(acrylic acid), poly (methacrylic acid), n-vinyl amides including polyacrylamide and polyvinylpyrrolidone, and poly(vinyl alcohol), its derivatives and copolymers; and combinations of these materials. Hydrophilic polymers, inorganic oxide particles, and organic beads may be present in one or more layers on the substrate and in various combinations within a layer.

A porous structure may be introduced into image-receiving layers comprised of hydrophilic polymers by the addition of ceramic or hard polymeric particulates, by foaming or blowing during coating, or by inducing phase separation in the layer through introduction of nonsolvent.

In practice, various additives may be employed in the image-receiving layer and protection overcoat. These additives include surface active agents surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers, and the like. In addition, a mordant may be added in small quantities (2%–10% by weight of the base layer) to improve waterfastness. Useful mordants are disclosed in U.S. Pat. No. 5,474,843.

The layers described above, including the image-receiving layer and the protection layer, may be coated by conventional coating means onto a transparent or opaque support material commonly used in this art. Coating methods may include, but are not limited to, wound wire rod coating, slot coating, slide hopper coating, gravure, curtain coating, and the like. Some of these methods allow for simultaneous coatings of both layers, which is preferred from a manufacturing economic perspective.

The image-receiving layer may be present in any amount which is effective for the intended purpose. In general, good results are obtained when it is present in an amount of from about 5 to about 30 g/m$^2$, preferably from about 8 to about 15 g/m$^2$, which corresponds to a dry thickness of about 5 to about 30 $\mu$m, preferably about 8 to about 15 $\mu$m.

The support for the ink jet recording element used in the invention can be any of those usually used for ink jet receivers, such as paper, resin-coated paper, poly(ethylene terephthalate), poly(ethylene naphthalate) and microporous materials such as poly polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861.

The receiver support used in the invention may have a thickness of from about 50 to about 500 $\mu$m, preferably from about 75 to 300 $\mu$m. Antioxidants, antistatic agents, plasticizers and other known additives may be incorporated into the support, if desired. In a preferred embodiment, either paper or poly(ethylene terephthalate) is employed.

In order to improve the adhesion of the image-receiving layer to the support, the surface of the support may be subjected to a corona-discharge-treatment prior to applying the image-receiving layer.

In addition, a subbing layer, such as a layer formed from a halogenated phenol or a partially hydrolyzed vinyl chloride-vinyl acetate copolymer can be applied to the surface of the support to increase adhesion of the image-receiving layer. If a subbing layer is used, it should have a thickness (i.e., a dry coat thickness) of less than about 2 $\mu$m.

The following examples further illustrates the invention.

EXAMPLES

Example 1

Control Element C-1

Various color patches were printed onto a receiver of Eastman Kodak Transparency Cat. No. 110 5725 at various densities using a Hewlett-Packard PhotoSmart® Printer and Hewlett-Packard Cartridges C3844A and C3845A containing colored and black dye-based inks. Control element C-1 was printed which did not have a protection overcoat layer.

Control Element C-2

This element was the same as Control Element C-1 except that the receiver was Konica QP Photo Quality Ink Jet Paper.

Control Element C-3

This element was the same as Control Element C-1 except that the receiver was Eastman Kodak Premium Picture Paper, Cat. No. 1118 1197.

Transfer Laminating Element 1

A transfer laminating element was prepared by coating a 25 $\mu$m poly(ethylene terephthalate) support with an aqueous solution of OC-1 EvCo Research Inc. PWRH-25, poly (ethylene terephthalate), (PET) transesterified in the presence of stearic acid and trimellitic acid at a dry thickness of 7.5 $\mu$m.

Transfer Laminating Element 2

This element was prepared the same as Transfer Laminating Element 1 except that the OC-1 was replaced with OC-2 EvCo Research Inc. PWRH-37, PET transesterified in the presence of stearic acid and trimellitic acid and which contained carboxylated styrene-butadiene, (1:1 wt. ratio).

Element 1 of the Invention

Control Element C-1 was laminated with Transfer Laminating Element 1 by passing through the nip of a pair of rollers. The laminating speed was 0.43 cm/sec and the upper roller was heated to 160° C. After transfer, the laminating element support was then peeled from the composite to provide the ink jet print with a protective overcoat.

Element 2 of the Invention

This element was prepared the same as Element 1 of the Invention except that Control Element C-2 instead of Control Element C-1.

Element 3 of the Invention

This element was prepared the same as Element 1 of the Invention except that Control Element C-3 instead of Control Element C-1.

Element 4 of the Invention

This element was prepared the same as Element 1 of the Invention except that Transfer Laminating Element 2 was used instead of Transfer Laminating Element 1.

Element 5 of the Invention

This element was prepared the same as Element 2 of the Invention except that Transfer Laminating Element 2 was used instead of Transfer Laminating Element 1.

Element 6 of the Invention

This element was prepared the same as Element 3 of the Invention except that Transfer Laminating Element 2 was used instead of Transfer Laminating Element 1.

Water and Stain Resistance Test

Drops of water, coffee, fruit punch and mustard were then placed on printed areas of the elements. The water drops and stain materials were allowed to penetrate for one hour and then blotted off using a lint-free cloth. A damp cloth was the used to gently wipe any stain remaining on the print. The sample was then evaluated by visually inspecting for staining, surface damage, dye loss, density loss, cracking or any other visible defect. The following ratings were used for the evaluation:

1=No change

2=Surface damage

3=Slight stain or color change

4=Significant stain or color change

The values for the stains were averaged together. The following results were obtained:

TABLE 1

| Element | Receiver | Protection Overcoat (7.5 μm) | Water Resistance | Stain Resistance |
|---|---|---|---|---|
| C-1 | A* | None | 4 | 4 |
| C-2 | B** | None | 4 | 4 |
| C-3 | C*** | None | 4 | 4 |
| 1 | A* | PWRH-25 | 2 | 3.3 |
| 2 | B** | PWRH-25 | 2 | 3.3 |
| 3 | C*** | PWRH-25 | 1 | 2.3 |
| 4 | A* | PWRH-37 | 2 | 3 |
| 5 | B** | PWRH-37 | 2 | 2 |
| 6 | C*** | PWRH-37 | 2 | 1.3 |

A* Eastman Kodak Transparency Cat. No. 110 5725
B** Konica QP Photo Quality Ink Jet Paper.
C*** Eastman Kodak Premium Picture Paper, Cat No. 118 1197.

The above results show that the elements of the invention having a protective overcoat had better water and stain resistance than the control elements.

Example 2

Lamination Test

Control Element 4

This element was prepared the same as Element 1 of the invention except that the transfer laminating element was a 75 μ thick commercial laminating film, Seal ThermaShield R® (Hunt Graphics Americas Co.).

Control Element 4 and Elements 1–6 of the invention were then evaluated for peel. Peel ratings from 1 to 5 are listed below. A peel rating of 1 corresponds to a continuous film that extends beyond the edge of the fused area and must be cut to separate it from the image, i.e., failure. A rating of 5 corresponds to a clean break at the interface. The following results were obtained:

TABLE 2

| Element | Peel Rating | Comment |
|---|---|---|
| 1 | 5 | Clean break at interface |
| 2 | 5 | Clean break at interface |
| 3 | 5 | Clean break at interface |
| 4 | 5 | Clean break at interface |
| 5 | 5 | Clean break at interface |
| 6 | 5 | Clean break at interface |
| Control 4 | 1 | Continuous film that required cutting |

The above results show that costly cutting steps can be eliminated using transfer laminating element of the invention.

Although the invention has been described in detail with reference to certain preferred embodiments for the purpose of illustration, it is to be understood that variations and modifications can be made by those skilled in the art without departing from the spirit and scope of the invention.

What is claimed is:

1. A process for laminating an ink jet print comprising:

a) providing an ink jet print comprising a support having thereon an ink jet image in an ink jet image-receiving layer;

b) contacting the imaged surface of the ink jet print with a transfer laminating element to form a composite, the transfer laminating element comprising a flexible, polymeric support having thereon a protection layer of a water-dispersible, hydrophobic polyester resin having the following general formula:

$$I_n\text{-}P\text{-}A_m$$

wherein

I is an ionic group;

n is an integer from 1–3;

P is a polyester backbone;

A is an aliphatic group comprising a straight or branched chain fatty acid or triglyceride thereof having from about 6 to about 24 carbon atoms; and m is an integer from 3–8, c) applying heat and pressure to the composite to transfer the layer on top of the ink jet image;

d) allowing the composite to cool; and e) peeling the flexible, polymeric support of the transfer laminating element from the composite to form the laminated ink jet print which has better water and stain resistance than said ink jet print which is unlaminated.

2. The process of claim 1 wherein said support is paper.

3. The process of claim 1 wherein said support is poly (ethylene terephthalate).

4. The process of claim 1 wherein said protection layer contains said water-dispersible, hydrophobic polyester resin and a thermoplastic or thermosetting polymer.

5. The process of claim 4 wherein said water-dispersible, hydrophobic polyester resin and said thermoplastic or thermosetting polymer is present in a ratio from about 1:4 to 4:1.

6. The process of claim 5 wherein said thermoplastic or thermosetting polymer comprises a copolymer of styrene and butadiene.

7. The process of claim 1 wherein said water-dispersible, hydrophobic polyester resin comprises water-dispersed transesterified polyester.

8. The process of claim 1 wherein said protection layer also contains a synthetic or natural wax and/or a microgel.

9. The process of claim 7 wherein said protection layer also contains a synthetic or natural wax and/or a microgel.

10. The process of claim 1 wherein said flexible, polymeric support of said transfer laminating element is poly (ethylene terephthalate).

* * * * *